(12) United States Patent  
Dubiner (10) Patent No.: US 8,175,864 B1  
(45) Date of Patent: May 8, 2012

(54) IDENTIFYING NEAREST NEIGHBORS FOR MACHINE TRANSLATION

(75) Inventor: Moshe Dubiner, Cupertino, CA (US)

(73) Assignee: Google Inc., Mountain View, CA (US)

(*) Notice: Subject to any disclaimer, the term of this patent is extended or adjusted under 35 U.S.C. 154(b) by 1073 days.

(21) Appl. No.: 12/060,126

(22) Filed: Mar. 31, 2008

Related U.S. Application Data (60) Provisional application No. 60/909,377, filed on Mar. 30, 2007.

(51) Int. Cl.
    *G06F 17/28* (2006.01)
    *G06F 17/27* (2006.01)
(52) U.S. Cl. .................................. 704/2; 704/9
(58) Field of Classification Search ............... 704/1–10
    See application file for complete search history.

(56) References Cited

U.S. PATENT DOCUMENTS

| | | | |
|---|---|---|---|
| 5,867,811 A * | 2/1999 | O'Donoghue .................. | 704/1 |
| 5,907,821 A * | 5/1999 | Kaji et al. ...................... | 704/4 |
| 6,236,958 B1 * | 5/2001 | Lange et al. ................... | 704/8 |
| 7,389,222 B1 * | 6/2008 | Langmead et al. ............ | 704/2 |
| 7,672,830 B2 * | 3/2010 | Goutte et al. .................. | 704/2 |
| 7,813,918 B2 * | 10/2010 | Muslea et al. ................ | 704/9 |
| 2003/0204400 A1 * | 10/2003 | Marcu et al. ................ | 704/251 |

OTHER PUBLICATIONS

Zhang et al. "Automatic Acquisition of Chinese-English Parallel Corpus from the Web", in Proceedings of 28th European Conference on Information Retrieval, 2006.*

* cited by examiner

*Primary Examiner* — Samuel G Neway
(74) *Attorney, Agent, or Firm* — Harness, Dickey & Pierce, P.L.C.

(57) ABSTRACT

This specification describes technologies relating to identifying nearest neighbors are provided. In one implementation, a method includes using a first and a second collections of n-grams and their associated probabilities to generate a plurality of randomized ranked collections of n-grams of each of the first natural language and the second natural language, each ranked collection of n-grams of the plurality of randomized ranked collection of n-grams having an ordering of n-grams according to a rarity of the n-grams in the respective first collection and the second collection of n-grams; using each of the plurality of ranked collections of n-grams to determine a plurality of signatures, each signature corresponding to a text of a collection of texts; and using the plurality of signatures to identify candidate text pairs within the collection of texts including a plurality of texts in the first and the second natural languages.

21 Claims, 4 Drawing Sheets

IDENTIFYING NEAREST NEIGHBORS FOR MACHINE TRANSLATION

CROSS-REFERENCE TO RELATED APPLICATIONS

This application claims the benefit under 35 U.S.C. §119 (e) of U.S. Provisional Patent Application No. 60/909,377, titled "Heterogeneous High Dimensional Approximate Nearest Neighbor Method," filed Mar. 30, 2007, which is incorporated here by reference.

BACKGROUND

This specification relates to training statistical machine translation.

Nearest neighbor techniques attempt to identify points in one collection of points that are nearer to points in a second collection of points than can be accounted for by chance. For example, there can be two collections of points, $X_0$ and $X_1$, where the points of each collection are randomly distributed in a high-dimensional space. Each point of $X_0$ is independent of $X_1$ except that a point $x_0$ in $X_0$ is significantly closer to an unknown point $x_1$ in $X_1$ than governed by chance. The nearest neighbor techniques attempt to efficiently identify these paired points.

Statistical machine translation systems are used to automatically translate text in a source language to corresponding text in a target language. In particular, statistical machine translation attempts to identify a most probable translation in a target language given a particular input in a source language. For example, when translating a sentence from Chinese to English, statistical machine translation identifies the most probable English sentence given the Chinese sentence. In statistical machine translation systems, a corpus of parallel text is used for training. The parallel text includes text documents in one natural language and corresponding translated text documents in one or more other natural languages. In some machine translation systems, a corpus of known parallel documents are used. For example, United Nations proceedings are available, which provide parallel translations in six languages. However, collections of known parallel texts are limited.

SUMMARY

This specification describes technologies relating to identifying nearest neighbors are provided. In general, one aspect of the subject matter described in this specification can be embodied in methods that include the actions of receiving a first collection of n-grams of a first natural language and a second collection of n-grams of a second natural language, the first and second collections of n-grams being associated with one or more probabilities; using the first and second collections of n-grams and the associated probabilities to generate multiple randomized ranked collections of n-grams of each of the first natural language and the second natural language, each ranked collection of n-grams of the multiple randomized ranked collection of n-grams having an ordering of n-grams according to a rarity of the n-grams in the respective first collection and the second collection of n-grams; using each of the multiple ranked collections of n-grams to determine multiple signatures, each signature corresponding to a text of a collection of texts; and using the multiple signatures to identify candidate text pairs within the collection of texts, the collection of texts including multiple texts in the first natural language and multiple texts in the second natural language. Other embodiments of this aspect include corresponding systems, apparatuses, and computer program products.

These and other embodiments can optionally include one or more of the following features. The identified probabilities include a translation probability that a particular n-gram of the first collection of n-grams corresponds to a particular n-gram of the second collection of n-grams. Generating multiple randomized ranked collections of n-grams further includes generating a probability matrix for each n-gram from the first and the second collections of n-grams using a first collection of text in the first natural language and a second collection of text in the second natural language, where the probability matrix for a particular n-gram identifies a probability for each of four categories: a probability that the n-gram is not found in either the first or second collection of text, a probability that the n-gram is found in the first collection of text but not the second collection of text; a probability that the n-gram is found in the second collection of text but not the first collection of text, and a probability that the n-gram is found in both the first and second collection of text; and generating a ranked collection of n-grams for each of the first natural language and the second natural language as a function of the generated probability matrix for each n-gram of the respective natural language.

The position of a particular n-gram in each ranked collection of n-grams is a randomized function of a reliability and a rarity of the particular n-gram within the collection of texts. Determining each signature further includes combining a ranked collection of n-grams for the first language and a ranked collection of n-grams for the second language into a single ranked collection of n-grams for a single language; determining a signature for each text in the collection of texts including multiple texts in the first natural language and multiple texts in the second natural language using the single ranked collection of n-grams; and lexicographically ordering the signatures for each text of the collection of texts based on an ordering of n-grams provided by the single ranked collection of n-grams. Identifying text pairs further includes comparing each signature corresponding to text in the first natural language with multiple adjacent signatures corresponding to text the second natural language according to a lexicographical ordering of signatures. The method further includes using the identified candidate text pairs to identify parallel texts.

Particular embodiments of the subject matter described in this specification can be implemented to realize one or more of the following advantages. The process of matching texts can be simplified. A rough matching of candidate texts is efficiently generated using a nearest neighbor technique to filter large collections of text. The rough matching is less computationally intensive while providing a high likelihood of identifying parallel texts from the parallel texts. The matching can be performed using a ranked listing of n-grams that preserves rarity of non-uniformly distributed n-grams. Additionally, the nearest neighbor technique for identifying candidate texts is well suited for distributed processing over the large collections of text.

DETAILED DESCRIPTION

Figure 1:
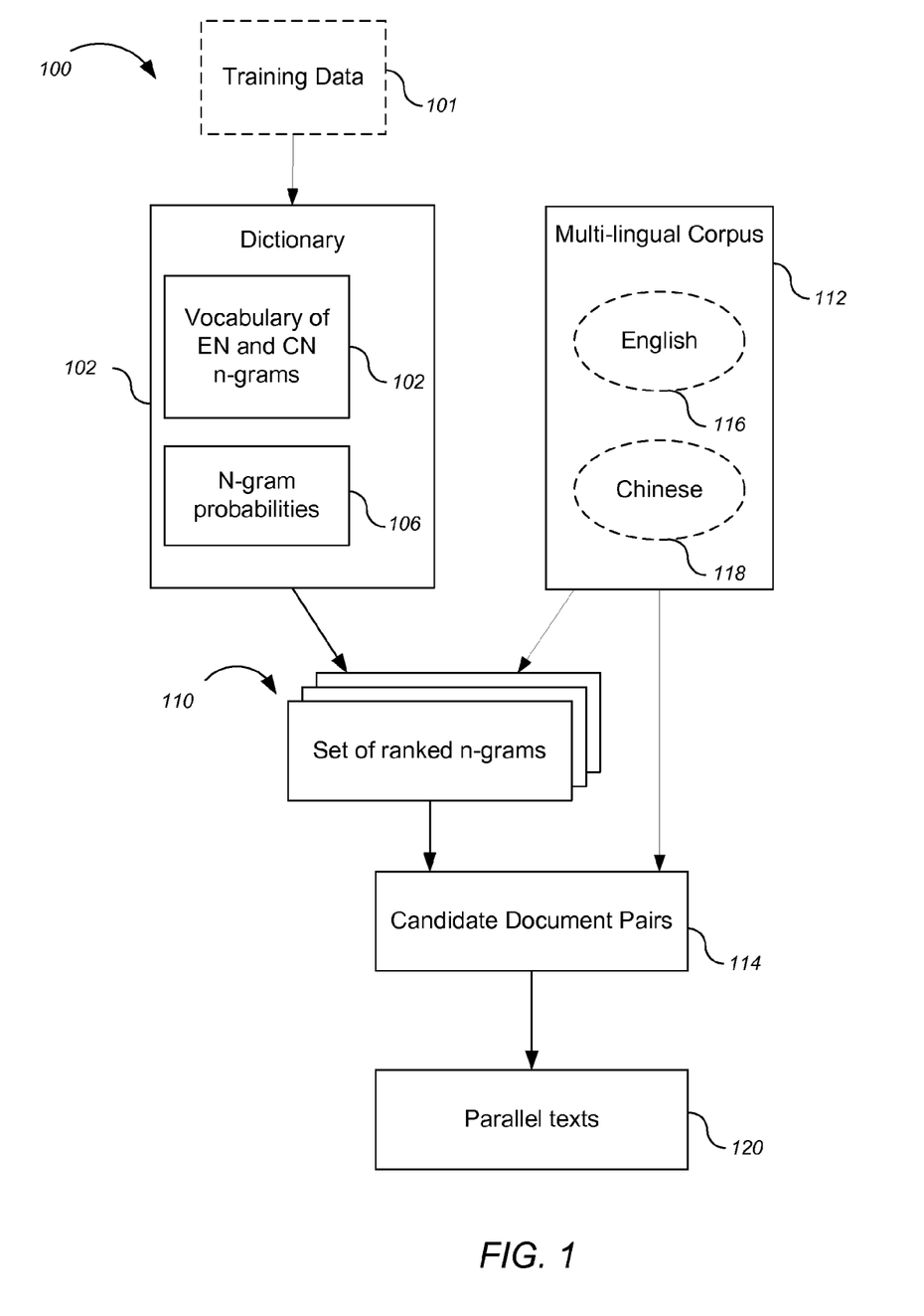
FIG. 1 is a block diagram of an example system for identifying parallel texts.

FIG. 1 is a block diagram of an example system 100 for identifying text pairs. The system 100 includes a dictionary 102. The dictionary 102 includes a vocabulary 104 of n-grams in two or more natural languages (e.g., English n-grams and Chinese n-grams). An n-gram is a sequence of n consecutive tokens. A token can include, for example, individual words, punctuation, and markers (e.g., identifying a beginning or end of a sentence). An n-gram has an order, which is the number of tokens in the n-gram. For example, a 1-gram (or unigram) includes one token while a 2-gram (or bigram) includes two tokens.

The dictionary 102 also includes probabilities 106 associated with the n-grams in the vocabulary 104. The n-grams of the vocabulary 104 and the associated probabilities 106 can be received or, alternatively, derived from particular training data 101. For example, the vocabulary 104 can be derived from a collection of text in a given language in the training data 101. The collection of text is examined to identify distinct n-grams in the collection for inclusion in the vocabulary 104. In some implementations, the vocabulary includes millions of distinct n-grams.

The probabilities 106 can include the probability that a particular n-gram occurs. Thus, for English, the probability includes the likelihood that a particular n-gram of the vocabulary 106 occurs in English. The probability of a given n-gram occurring can be calculated based on the frequency of the n-gram in some corpus (i.e., the count of the n-gram) divided by the total number of n-grams in the corpus.

Additionally, larger order n-grams can be calculated using conditional probabilities of n-gram substrings. For example, the conditional probability for a bigram, represented by P(y|x), is the probability that token y follows token x. The conditional probabilities can also be calculated empirically using the collection of text in the training data 101.

The probabilities 106 can also include the conditional probability of a particular target language n-gram given a particular source language n-gram (e.g., a translation probability). For example, the training data can be used to determine translation probabilities. The training data 101 can also include a collection of known document pairs that are respective translations of each other (e.g., parallel texts). In particular, the n-grams in the vocabulary 104 can be paired with one or more corresponding translated n-grams (e.g., an n-gram of one language and a corresponding n-gram of a second language). Thus, for an English source language and a Chinese target language, a translation probability P(c|e) of a Chinese n-gram c given an English n-gram e is calculated.

A particular translation model can be trained on a training corpus to estimate the most likely translation probabilities. For example, a translation model can be defined according to a number of parameters that are estimated according to particular rules and trained on particular training data. An example of a translation model is the IBM Model 3 described, for example, in P. F. Brown, V. J. Della Pietra, S. A. Della Pietra, and R. L. Mercer, *The Mathematics of Statistical machine Translation: Parameter Estimation, Computational Linguistics* 19(2), 1993.

The system 100 also includes a set of ranked n-grams 110. The set ranked n-grams 110 include multiple ordered n-grams derived using the vocabulary 104 generated using a pseudo-random technique. The ordering of the respective ranked n-grams 110 are derived using probabilities estimated from training data (e.g., the probabilities 106). In some implementations, as shown in FIG. 1, the n-grams included in the set of ranked n-grams 110 are based on the n-grams identified in the texts found within the multi-lingual corpus 112, which will also be used to identify candidate text pairs. For example, using only the n-grams found in the multi-lingual texts can avoid using n-grams of the vocabulary 104 that are not found in the example texts of the multi-lingual corpus 112. Generating ranked n-grams 110 is described in greater detail below.

The set of ranked n-grams 110 are used with multi-lingual corpus 112 to identify candidate text pairs 114. In particular, the set of ranked n-grams 110 is used to generate multiple signatures. The multi-lingual corpus 112 includes text in two or more languages that are not paired (e.g., English texts 116 and Chinese texts 118). Thus, for a given text in one natural language it is unknown whether, or which, text in one language is a translation of a text in another language. The text in the multi-lingual corpus 112 can include collections of web data including documents, web pages, new articles, blog entries, instant messaging text, or other sources of text.

The candidate text pairs 114 include paired text identified as possible parallel texts based on analysis of text of one language with multiple texts in the target language as a function of the ranked n-grams 110 and the multi-lingual corpus 112. Identifying candidate text pairs is described in greater detail below. The candidate text pairs 114 can be further processed to identify parallel texts 120.

Figure 2:
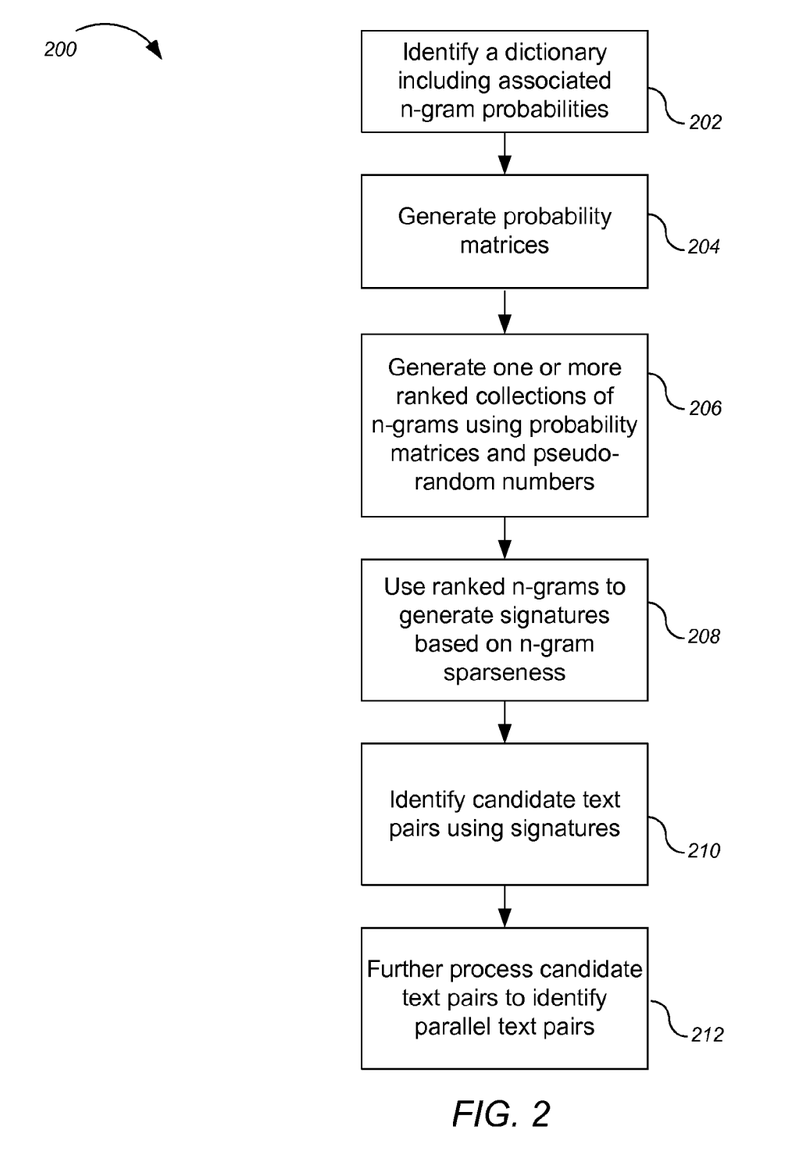
FIG. 2 is a flowchart of an example process for identifying parallel texts.

FIG. 2 is a flowchart of an example process 200 for identifying parallel texts. For convenience, the process 200 will be described with respect to a system that performs the process 200.

The system identifies 202 a dictionary including associated n-gram probabilities (e.g., dictionary 102). In some implementations, the dictionary is received in a completed form including a vocabulary of n-grams in two or more natural languages as well as probabilities associated with the n-grams. In particular, the dictionary can include n-gram pairs (including an n-gram of a first language and an n-gram of a second language) and associated translation probabilities.

The dictionary can be received as one or more tables including n-grams, or n-gram pairs, and one or more respective associated probabilities. The dictionary can be received, for example from a remote location or another system that generated the vocabulary and probabilities using some collection of training data.

Alternatively, in some implementations, the dictionary is generated by the system. Generating the dictionary can include processing training data to identify a vocabulary of n-grams found in the training data and calculating probabilities of the n-grams (e.g., based on the frequency of the n-grams in the training data as well as based on a specified translation model).

The system generates 204 probability matrices for the n-grams. The probability matrices are generated based on the n-grams of the dictionary and the probabilities calculated using particular training data. A particular probability matrix is generated for each n-gram using example pairs of text (e.g., a pair of documents including a first document in a first language and a second document in a second language).

Each probability matrix includes four categories: 1) neither text of the pair includes the particular n-gram, denoted (0, 0); 2) the first text of the pair includes the particular n-gram but the second text does not, denoted (1, 0); 3) the first text of the pair does not include the particular n-gram but the second text does, denoted (0, 1); and 4) both the first text and the second text of the pair include the particular n-gram, denoted (1, 1). Thus, the probability matrix for each n-gram can be written:

$$P = \begin{pmatrix} p_{00} & p_{01} \\ p_{10} & p_{11} \end{pmatrix},$$

where $p_{00}+p_{01}+p_{10}+p_{11}=1$.

For example, for text pairs including an English text and a Chinese text, the four categories include the probability that the n-gram is found in neither English nor Chinese text, the probability that the n-gram is found in the English text but not the Chinese text, the probability that the n-gram is found in the Chinese text but not the English text, and the probability that the n-gram is found in both the English text and Chinese text.

In some implementations, the respective probabilities of each probability matrix are calculated by dividing a count identifying an occurrence of the n-gram in the particular category by all n-grams in the example pairs. In some implementations, the calculated probabilities of the probability matrix for each n-gram is smoothed to account for sparse data. For example, a probability of a particular n-gram may be very low due to the size and content of the training data that is not representative of the true probability of the n-gram. In some implementations, the probabilities of each category are boosted by a particular amount to account for the n-grams being more likely than shown by the example pairs of text (e.g., boosting each probability by one half of the calculated probability).

The system generates 206 one or more ranked collections of n-grams using the probability matrices and pseudo-random numbers. The generation of ranked collections of n-grams for a pair of languages is referred to as a try. For each try, each n-gram of the pair of languages is assigned a ranked position (e.g., from 1 to 10 million) in the respective ranked collection of n-grams as a function of a rarity and a reliability of the particular n-gram. Additionally, a pseudo-random number is introduced for each try. While a number of individual randomized tries may not result in candidate pairs that identify parallel text pairs, enough tries can be performed such that some ranked collections of n-grams are likely to identify parallel text. More particularly, the position of each n-gram in the ranked order is determined according to:

$$(1 - r_{t,i}) \frac{p_{i,11}}{p_{i,01} + p_{i,10}} \ln \frac{1}{p_{i,1*}},$$

where $(1-r_{t,i})$ represents the pseudo random number for try t of T tries where each random number $r_{t,i}$ has a value between 0 and 1, which can vary for each n-gram in the try as well as between tries. Also, $$\frac{p_{i,11}}{p_{i,01} + p_{i,10}}$$

represents the reliability of the n-gram i, where $p_{11}$, $p_{01}$, and $p_{10}$ represent probabilities from the respective probability matrix of n-gram i. In particular, the reliability is the probability that the n-grams agree in each text divided by the probability that they disagree. Additionally, $$\ln \frac{1}{p_{i,1*}}$$

represents the rarity of the n-gram where $p_{i,1*}$ represents the n-gram probability from the probability matrix where * represents "don't care" value (e.g., can be $p_{10}$ or $p_{11}$). Additional details on the n-gram ranking formula are described below.

Consequently, for each try t, a pair of ranked collections of n-grams are generated (e.g., for each of a pair of languages an ordering of the n-grams in a first language and a second language is generated). Each ranked collection of n-grams places the more reliable and rarer n-grams in positions above the more common and less reliable n-grams. Each try can produce a different ordering of n-grams due to the randomization introduced by the pseudo-random number.

The system uses 208 ranked n-grams to generate signatures based on n-gram sparseness. The ranked collections of n-grams for a pair of languages (e.g., English and Chinese) are each converted into a single ranked collection of n-grams in a single language, which will be referred to as a signature. For example, the translations identified by n-gram pairs can be used to translate n-grams of one ranked collection of n-grams from one language to another (e.g., translating the ranked collection of Chinese n-grams into English). The ranked collections of n-grams are then combined to form an overall ranked collection of n-grams in a single language.

Additionally, the system determines respective signatures (e.g., portions of the signature derived from each text) for collections of texts in both languages (e.g., from a corpus of unpaired text including a collection of text in each of a first and second language (e.g., multi-lingual corpus 112 of FIG. 1)) using the single language ranked collection of n-grams. These signatures, or sub-signatures, for the texts are lexicographically ordered together so that equalities between the signatures of highest ranking parts can be identified.

For example, the n-grams in each text are compared with the signature defined by the ranked collection of n-grams to identify a corresponding signature or sub-signature for the text based on the n-grams contained in the text relative to the ordering provided by the signature. Each text can then be lexicographically ordered relative to one another based on the respective sub-signatures. Thus, the signatures for each text can be ordered based on the n-grams found within the corresponding text according to the n-gram ordering provided by the ranked collection of n-grams.

Thus, a signature (or sub-signature) is generated for each text in the collection of text for the ranked n-grams for each language using the single language ranked collection of n-grams (e.g., for both English texts searched using the ranking of English n-grams and Chinese texts searched using an ranking of Chinese n-grams). Additionally, the signatures can be generated for each ranked collection of n-grams generated from other tries. For example, if ten tries were performed resulting in ten distinct English ranked collection of n-grams, signatures are identified using each distinct ranked collection of n-grams.

The signatures for each text are generated based on whether particular n-grams of the ranked collection of n-grams are found in the text. In some implementations, each text is only examined to generate a sub-signature of limited length (e.g., according to some stopping criteria, for example, until a specified number of n-grams are identified, in order, from the ranked collection in text) based on the relative rarity of the n-grams found in each particular text such that there is confidence that the signature for the text is rare enough that only a few other signatures from other texts will match, but not so rare as to make matching any signature unlikely.

As shown in FIG. 2, the system identifies 210 candidate text pairs using the generated signatures for texts. The generated signatures for texts are compared with signatures generated for text in another language in order to identify candidate text pairs including a first text in a first language and a second text in a second language that may be parallel translations of each another.

Figure 3:
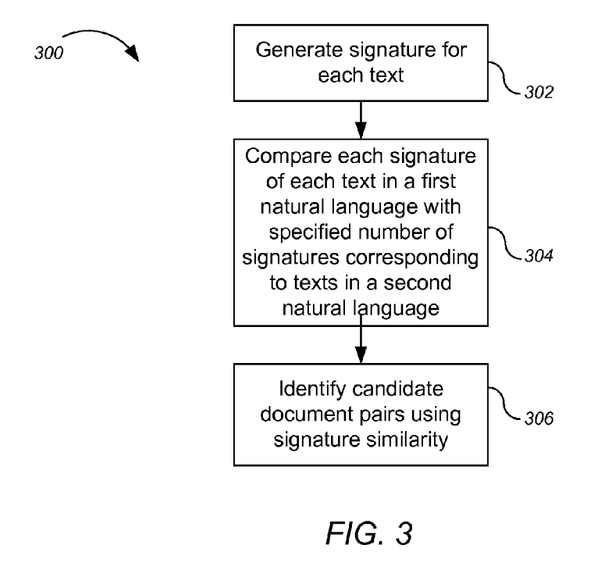
FIG. 3 is a flowchart of an example process for identifying candidate text pairs using signatures.

FIG. 3 is a flowchart of an example process 300 for identifying candidate text pairs using signatures. For convenience, the process 300 will be described with respect to a system that performs the process 300.

The system generates 302 a signature for each text in a multi-lingual corpus of text. The corpus of text includes text in more than one language including a first language and a second language. The signatures can be determined, for example, as described above with respect to FIG. 2.

The system compares 304 each signature corresponding to each text in the first language with specified number of signatures corresponding to texts in the second language. In some implementations, the signature of each text is compared with each other signature.

However, the number of texts can be large. Consequently, in some implementations, each signature for texts in a first language is compared with a specified number of signatures for text in the second language. For example, each signature corresponding to text in the first language can be compared to ten signatures corresponding to texts in the second language. The ten signatures corresponding to texts in the second language can be identified as adjacent signatures (e.g., nearest neighbors). The system can identify adjacent signatures since the signatures for the texts have been lexicographically ordered. Thus, for example, the system can compare a given signature corresponding to a text in the first language to a group of signatures preceding and following the signature corresponding to text in the second language (e.g., the five preceding signatures and the five following signatures).

Figure 4:
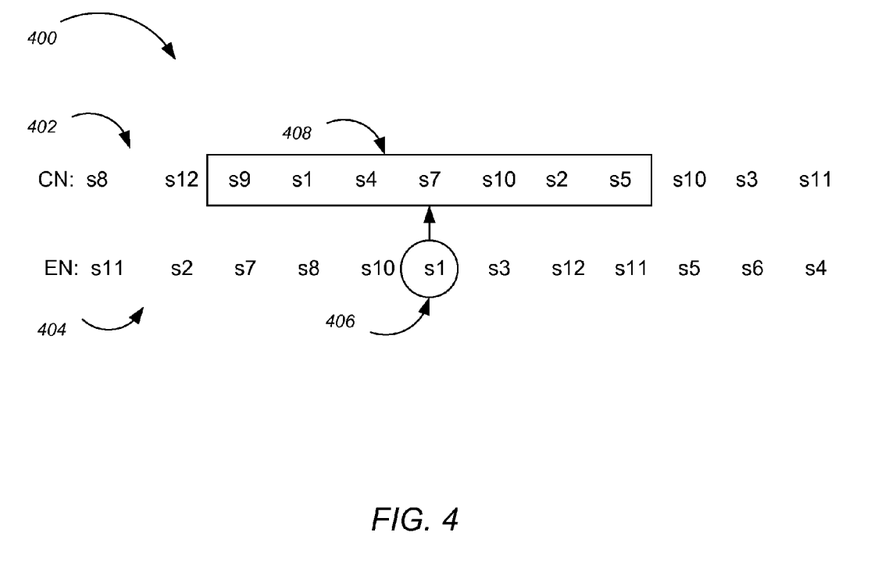
FIG. 4 is a diagram of an example of comparing signatures.

FIG. 4 is a diagram 400 of an example of comparing text signatures. Diagram 400 includes example lexicographically ordered signature listings for a portion of the corpus of texts in a first language (English) and a second language (Chinese). In particular, diagram 400 shows Chinese text signatures 402 where each signature corresponds to a particular Chinese language text and English text signatures 404 where each signature corresponds to a particular English language text. For a given English signature 406, a comparison is made with a group of Chinese text signatures 408. In particular, since the signatures have been lexicographically ordered and organized by corresponding language, each signature can be compared with adjacent signatures corresponding to texts in the other language.

Although shown as separate listings for clarity, the signatures corresponding to English texts are adjacent to the signatures corresponding to the Chinese texts. For example, as shown in FIG. 4, signature 406 (e.g., signature "S1") corresponding to an English text was selected. This signature is compared with lexicographically adjacent signatures 408 corresponding to Chinese text (namely signatures S9, S1, S4, S7, S10, S2, and S5). These signatures correspond to texts identified as the nearest neighbors to the text corresponding to signature 406. Alternatively, a single lexicographically ordered list of signatures can be generated where adjacent signatures to an identified signature are identified as the closest neighboring signatures having texts corresponding to the other language (e.g., if an identified signature corresponds to an English text, the adjacent signature compared are those nearby signatures corresponding to Chinese texts).

As shown in FIG. 3, the system identifies 306 candidate text pairs using signature similarity. The candidate text pairs can be identified based on a degree of similarity between the compared signatures. For example, in some implementations, the signatures must be exact matches. Alternatively, texts corresponding to adjacent signatures are all included as candidate text pairs. Each is then compared in more detail to identify whether or not they are parallel texts.

In some alternative implementations a similarity score is calculated based on some required similarity threshold required to identify matching signatures. For example, an edit distance or similar calculation can be made to identify how similar two signatures are where the number of edits to match the signatures must fall below the threshold value. If the compared signatures satisfy the specified similarity criteria, the corresponding texts are identified as candidate text pairs.

As shown in FIG. 2, the system processes 212 the candidate text pairs to identify parallel text pairs. In particular, the candidate text pairs identify a rough collection of possible parallel texts derived form a large corpus of text. However, many candidate pairs may not actually be parallel text. Further processing is used to identify parallel text from these candidate text pairs. For example, other statistical techniques can be performed on this smaller collection to more finely identify likely parallel texts. Standard techniques for determining whether two texts are, or are likely to be, parallel texts can be used. These techniques can include comparing the texts as a bag of words using a dictionary with corresponding translation probabilities and word frequencies to determine whether the two texts include the same words.

Additionally, in some implementations, sentence alignment (e.g., using statistical techniques) is performed on the candidate pairs, the results of which can be evaluated to determine whether the texts are parallel. The term "alignment" will be used to refer to a data structure that represents a segment-for-segment connection between source and target segments in a pair of documents. In some implementations, the alignment is simply a vector identifying positions of source segments that various target segments connect to. For example, if a sentence in one document is aligned to a sentence in the second document of the candidate pair, a translation dictionary can be used to determine whether the alignment is accurate. Additional details on alignment can be found, for example, in Franz Joseph Och and Hermann Ney, *A Systematic Comparison of Various Statistical Alignment Models*, Computational Linguistics, 29(1): 9-51, March 2003.

In some implementations, the technique for identifying candidate texts can be performed in a distributed environment. For example, portions of a multi-lingual corpus can be separated into chunks that can be separately processed. For example, the signatures for each text can be separately determined for the text on each chunk. Alternatively, in some other implementations, the ranked collection of n-grams can be assembled by combining portions generated in a distributed manner. Portions can be processed and combined using various techniques. In some implementations, a MapReduce process can be used.

MapReduce is a programming model for processing large data sets. The basic paradigm is borrowed from functional programming and requires the user to provide two functions: map and reduce. The map function processes a single key and value pair from the input and produces a set of intermediate key and value pairs. The reduce function merges all values associated with a single intermediate key, producing a set of output values. MapReduce's run-time system handles the details of coordination among thousands of machines. The strength of MapReduce lies in parallel execution. Typically, the map function is replicated on different machines operating on different parts of the input data. The intermediate data is partitioned by the intermediate key so that the reduce function can also be executed in parallel. Because there are no dependencies among map workers or among reduce workers, the parallelization of each step is highly efficient. The MapReduce programming model is described, for example, in Jeffrey Dean and Sanjay Ghemawat, *MapReduce: Simplified Data Processing on Large Clusters*, Proceedings of the 6th Symposium on Operating Systems Design and Implementation, pages 137-150, December 2004.

The process of identifying nearest neighbors can be used more generally to identify nearest neighbors for any two distinct sets having a non-uniform distribution. For example, any two sets of data where there is some relationship between points in one set and points in the other set can by analyzed in this manner to identify candidate points in one set as related to points in the other set.

The formula described above for ranking the n-grams provides an alternative to a generalized formula that takes advantage of the rarity of particular n-grams (i.e., the n-grams are not uniformly distributed: some are more likely than others based on probability estimates).

In the more generalized case, the n-grams are discrete points in sets $X_0$ and $X_1$, each having b discrete values, where the n-grams of each set are randomly distributed in a high-dimensional space. The respective sets $X_0, X_1 \subset \{0, 1, \ldots, b-1\}^d$ have dimension d, cardinalities $\#X_0 = n_0$, $\#X_1 = n_1$, and are randomly distributed. The $X_0$ points are identically distributed independent Bernoulli random vectors, with $p_{i,j*}$ denoting the probability that coordinate i has value j. There is a particular pair of $X_0$, $X_1$ points randomly selected from the $n_0 n_1$ possible pairs. For the particular pair, the probability that both their i'th coordinates equal j is $p_{i,j}$ without dependence between coordinates. The remaining points in $X_1$ can be anything such that:

$$p_{i,b} = 1 - \sum_{j=0}^{b-1} p_{i,j}, \text{ where}$$

$$P_i = \begin{pmatrix} p_{i,0} & p_{i,1} & \cdots & p_{i,b-1} \\ p_{i,0*} & p_{i,1*} & \cdots & p_{i,b-1*} \end{pmatrix}.$$

For a number of bucketing tries, d independent uniform [0, 1] random real numbers are generated, $0 < r_1, r_2, r_d < 1$, one random number per coordinate. For each coordinate i, a particular random exponent $\lambda_i \geq 0$ is the unique solution to the equation:

$$\sum_{j=0}^{b-1} \frac{p_{i,j}}{(1-r_i)p_{i,j*}^{\lambda_i} + r_i} = 1.$$

Where $p_{i,j*}^{\lambda_i}$ means $(p_{i,j*})^{\lambda_i}$. When no solution exists, 1 is equal to infinity. All of the $n_0 + n_i$ points are sorted lexicographically with lower exponent coordinates given precedence over larger exponent coordinates. The coordinate values $0, 1, \ldots, b-1$ are arbitrarily arranged. Each $X_1$ point is compared with a specified number, a, of preceding and following $X_0$ points (or fewer near the ends). The comparison can be performed in a specified one-on-one way and the technique is considered successful if it asks for the correct comparison. The best value for a is problem and system dependent, but should not be large. In some implementations, each try performs $2an_1$ comparisons.

One way to represent the lexicographic ordering of the technique is to first sort the random exponents identified for try t as: $\lambda_{\pi 1} < \lambda_{\pi 2} < \ldots < \lambda_{\pi d}$. Then, each point $$x = (x_1, x_2, \ldots, x_d) \in \{0, 1, \ldots, b-1\}^d$$

is projected into the interval [0, 1] by $$R_t(x) = \sum_{i=1}^{d} p_{\pi 1, x_{\pi 1*}} p_{\pi 2, x_{\pi 2*}} \cdots p_{\pi(i-1), x_{\pi(i-1)*}} \sum_{j=0}^{x_{\pi i}-1} p_{\pi i, j*}.$$

The projection order is a lexicographic order. For large dimension d, $R_t(x)$ is approximately uniformly distributed in [0, 1].

When rarity (i.e., sparseness of points) is considered the modifications lead to the alternative version of the technique for ordering described above. In particular, for sparse bits, $p_{i,1*}, p_{i,0*} + p_{i,11} \ll 1$. Additionally, for some fixed $\delta > 0$, $p_{i,11} \geq \delta(p_{i,01} + p_{i,10})$. Then, the equation:

$$\frac{p_{i,00}}{(1-r_i)p_{i,0*}^{\lambda_i} + r_i} + \frac{p_{i,11}}{(1-r_i)p_{i,1*}^{\lambda_i} + r_i} = 1$$

has two asymptotic regimes: one in which $p_{i,0*}^{\lambda_i}$ is nearly constant and $p_{i,1*}^{\lambda_i}$ changes, and vice versa. The first region is relevant in this case for an asymptotic analysis and provides:

$$p_{i,00} + \frac{p_{i,11}}{(1-r_i)p_{i,1*}^{\lambda_i} + r_i} \approx 1, \text{ where}$$

$$\lambda_i \approx \frac{\ln\left[1 - \frac{1}{(1-r_i)\left(1 + \frac{p_{i,11}}{p_{i,01} + p_{i,10}}\right)}\right]}{\ln p_{i,1*}}.$$

However, since in practice the probabilities are estimated from the data and sparse estimates are unreliable by their nature, a more conservative formulation is used, namely:

$$\frac{1}{\tilde{\lambda}_i} = (1 - r_{t,i}) \frac{p_{i,11}}{p_{i,01} + p_{i,10}} \ln \frac{1}{p_{i,1*}}$$

which is the ranking formula described above.

This technique preserves rarity. Thus, if instead of points $$x = (x_1, x_2, \ldots, x_d) \in \{0, 1\}^d,$$

we have subsets of a features set D (e.g., n-grams) of cardinality d:

$$D_x \subset D.$$

In a try t the technique uses a hash function $hash_t: D \rightarrow [0,1]$. For each feature its random exponent $x_i$ is computed using the pseudo random $r_i = hash_t(i)$ and the random exponents of x are sorted:

$$\lambda_{\pi 1} < \lambda_{\pi 2} < \ldots < \lambda_{\pi v}.$$

Then the sequence of features $(\pi_1, \pi_2, \ldots, \pi_o)$ is a sparse representation of x whose lexicographic order is used in try t.

Figure 5:
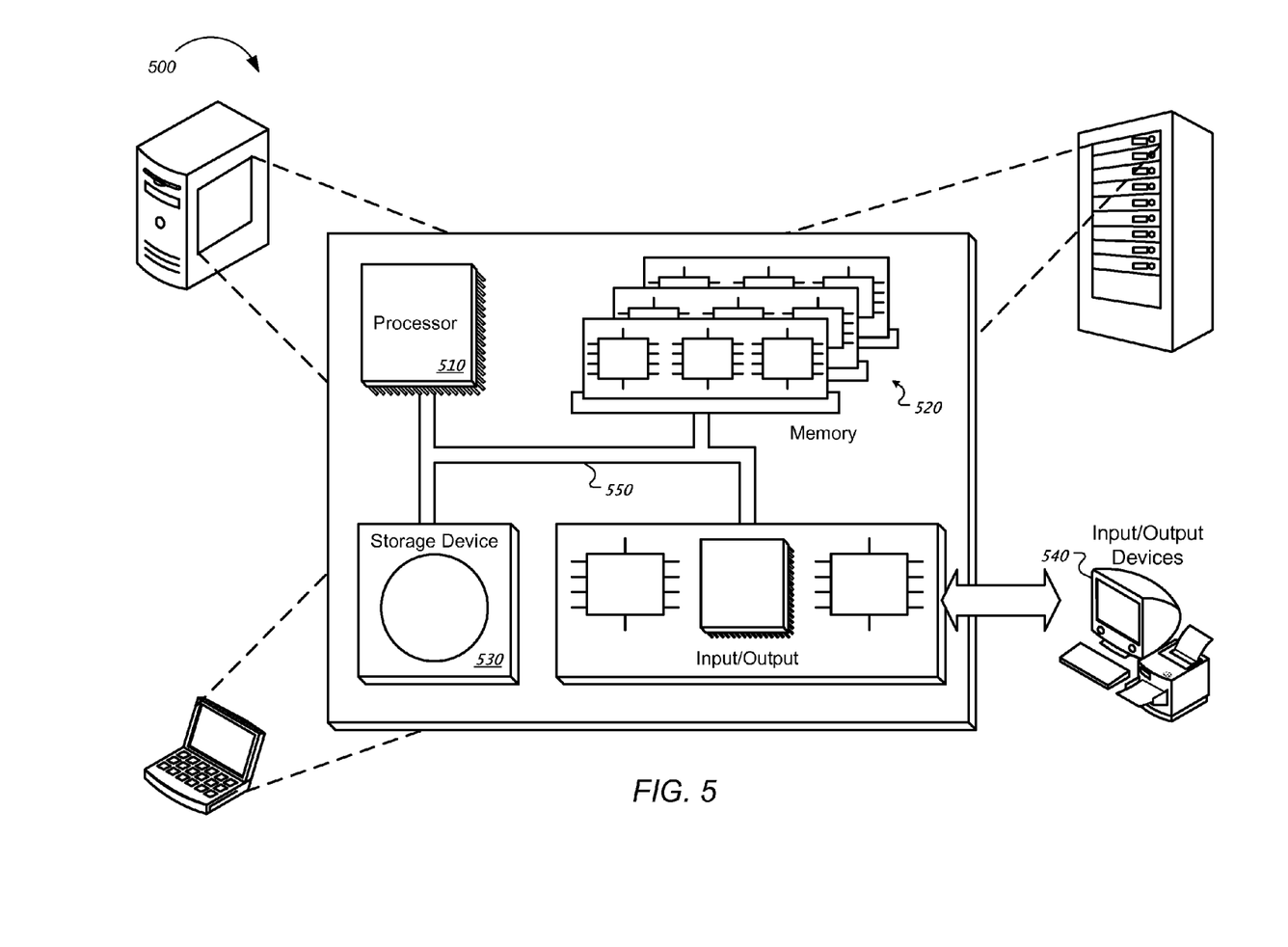
FIG. 5 is a schematic diagram of a generic computer system.

FIG. 5 is a schematic diagram of a generic computer system 500. The system 500 can be used for practicing operations described, for example in association with the method 200 of FIG. 2, in one embodiment, or the method 400 of FIG. 4, in another embodiment. The system 500 can include a processor 510, a memory 520, a storage device 530, and input/output devices 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 is a computer readable medium such as volatile or non volatile that stores information within the system 500. The storage device 530 is capable of providing persistent storage for the system 500. The storage device 530 may be a floppy disk device, a hard disk device, an optical disk device, or a tape device, or other suitable persistent storage means. The input/output device 540 provides input/output operations for the system 500. In one implementation, the input/output device 540 includes a keyboard and/or pointing device. In another implementation, the input/output device 540 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
   receiving, at one or more computers, a first collection of n-grams of a first natural language and a second collection of n-grams of a second natural language, the first and second collections of n grams being associated with one or more probabilities;
   using, at the one or more computers, the first and second collections of n-grams and the associated probabilities to generate a plurality of randomized ranked collections of n-grams for each of the first natural language and the second natural language, each ranked collection of n-grams of the plurality of randomized ranked collection of n-grams having an ordering of n-grams according to a rarity of the n grams in the respective first collection and the second collection of n-grams;
   using, at the one or more computers, each of the plurality of randomized ranked collections of n-grams to determine a plurality of signatures, each signature corresponding to a text of a collection of texts; and
   using, at the one or more computers, the plurality of signatures to identify candidate text pairs within the collection of texts, the collection of texts including a plurality of texts in the first natural language and a plurality of texts in the second natural language.

2. The method of claim 1, where the identified probabilities include a translation probability that a particular n-gram of the first collection of n-grams corresponds to a particular n-gram of the second collection of n-grams.

3. The method of claim 1, where generating a plurality of randomized ranked collections of n-grams further comprises:
   generating, at the one or more computers, a probability matrix for each n-gram from the first and the second collections of n-grams using a first collection of text in the first natural language and a second collection of text in the second natural language, where the probability matrix for a particular n-gram identifies a probability for each of four categories: a probability that the n gram is not found in either the first or second collection of text, a probability that the n gram is found in the first collection of text but not the second collection of text; a probability that the n gram is found in the second collection of text but not the first collection of text, and a probability that the n-gram is found in both the first and second collection of text; and
   generating, at the one or more computers, a ranked collection of n-grams for each of the first natural language and the second natural language as a function of the generated probability matrix for each n-gram of the respective natural language.

4. The method of claim 3, where the position of a particular n-gram in each ranked collection of n-grams is a randomized function of a reliability and a rarity of the particular n gram within the collection of texts.

5. The method of claim 1, where determining each signature further comprises:
   combining, at the one or more computers, a first randomized ranked collection of n-grams for the first language and a second randomized ranked collection of n-grams for the second language into a single ranked collection of n-grams for a single language;
   determining, at the one or more computers, a signature for each text in the collection of texts including a plurality of text in the first natural language and a plurality of text in the second natural language using the single ranked collection of n-grams; and
   lexicographically ordering, at the one or more computers, the signatures for each text of the collection of texts based on an ordering of n-grams provided by the single ranked collection of n-grams.

6. The method of claim 1, where identifying text pairs further comprises:
   comparing, at the one or more computers, each signature corresponding to text in the first natural language with a plurality of adjacent signatures corresponding to text the second natural language according to a lexicographical ordering of signatures.

7. The method of claim 1, further comprising:
   using, at the one or more computers, the identified candidate text pairs to identify parallel texts.

8. A computer program product, encoded on a non-transitory computer-readable medium, operable to cause data processing apparatus to perform operations comprising:
   receiving a first collection of n-grams of a first natural language and a second collection of n-grams of a second natural language, the first and second collections of n grams being associated with one or more probabilities;
   using the first and second collections of n-grams and the associated probabilities to generate a plurality of randomized ranked collections of n-grams for each of the first natural language and the second natural language, each ranked collection of n-grams of the plurality of randomized ranked collection of n-grams having an ordering of n-grams according to a rarity of the n grams in the respective first collection and the second collection of n-grams;
   using each of the plurality of randomized ranked collections of n-grams to determine a plurality of signatures, each signature corresponding to a text of a collection of texts; and
   using the plurality of signatures to identify candidate text pairs within the collection of texts, the collection of texts including a plurality of texts in the first natural language and a plurality of texts in the second natural language.

9. The computer program product of claim 8, where the identified probabilities include a translation probability that a particular n-gram of the first collection of n-grams corresponds to a particular n-gram of the second collection of n-grams.

10. The computer program product of claim 8, where generating a plurality of randomized ranked collections of n-grams further comprises:
   generating a probability matrix for each n-gram from the first and the second collections of n-grams using a first collection of text in the first natural language and a second collection of text in the second natural language, where the probability matrix for a particular n-gram identifies a probability for each of four categories: a probability that the n gram is not found in either the first or second collection of text, a probability that the n gram is found in the first collection of text but not the second collection of text; a probability that the n gram is found in the second collection of text but not the first collection of text, and a probability that the n-gram is found in both the first and second collection of text; and
   generating a ranked collection of n-grams for each of the first natural language and the second natural language as a function of the generated probability matrix for each n-gram of the respective natural language.

11. The computer program product of claim 10, where the position of a particular n-gram in each ranked collection of n-grams is a randomized function of a reliability and a rarity of the particular n gram within the collection of texts.

12. The computer program product of claim 8, where determining each signature further comprises:
   combining a first randomized ranked collection of n-grams for the first language and a second randomized ranked collection of n-grams for the second language into a single ranked collection of n-grams for a single language;
   determining a signature for each text in the collection of texts including a plurality of text in the first natural language and a plurality of text in the second natural language using the single ranked collection of n-grams; and
   lexicographically ordering the signatures for each text of the collection of texts based on an ordering of n-grams provided by the single ranked collection of n-grams.

13. The computer program product of claim 8, where identifying text pairs further comprises:
   comparing each signature corresponding to text in the first natural language with a plurality of adjacent signatures corresponding to text the second natural language according to a lexicographical ordering of signatures.

14. The computer program product of claim 8, further operable to perform operations comprising:
   using the identified candidate text pairs to identify parallel texts.

15. A system comprising:
   one or more computers configured to perform operations including:
      receiving a first collection of n-grams of a first natural language and a second collection of n-grams of a second natural language, the first and second collections of n grams being associated with one or more probabilities;
      using the first and second collections of n-grams and the associated probabilities to generate a plurality of randomized ranked collections of n-grams for each of the first natural language and the second natural language, each ranked collection of n-grams of the plurality of randomized ranked collection of n-grams having an ordering of n-grams according to a rarity of the n grams in the respective first collection and the second collection of n-grams;
      using each of the plurality of randomized ranked collections of n-grams to determine a plurality of signatures, each signature corresponding to a text of a collection of texts; and
      using the plurality of signatures to identify candidate text pairs within the collection of texts, the collection of texts including a plurality of texts in the first natural language and a plurality of texts in the second natural language.

16. The system of claim 15, where the identified probabilities include a translation probability that a particular n-gram of the first collection of n-grams corresponds to a particular n-gram of the second collection of n-grams.

17. The system of claim 15, where generating a plurality of randomized ranked collections of n-grams further comprises:
   generating a probability matrix for each n-gram from the first and the second collections of n-grams using a first collection of text in the first natural language and a second collection of text in the second natural language, where the probability matrix for a particular n-gram identifies a probability for each of four categories: a probability that the n gram is not found in either the first or second collection of text, a probability that the n gram is found in the first collection of text but not the second collection of text; a probability that the n gram is found in the second collection of text but not the first collection of text, and a probability that the n-gram is found in both the first and second collection of text; and
   generating a ranked collection of n-grams for each of the first natural language and the second natural language as a function of the generated probability matrix for each n-gram of the respective natural language.

18. The system of claim 17, where the position of a particular n-gram in each ranked collection of n-grams is a randomized function of a reliability and a rarity of the particular n gram within the collection of texts.

19. The system of claim 15, where determining each signature further comprises:
   combining a first randomized ranked collection of n-grams for the first language and a second randomized ranked collection of n-grams for the second language into a single ranked collection of n-grams for a single language;
   determining a signature for each text in the collection of texts including a plurality of text in the first natural language and a plurality of text in the second natural language using the single ranked collection of n-grams; and
   lexicographically ordering the signatures for each text of the collection of texts based on an ordering of n-grams provided by the single ranked collection of n-grams.

20. The system of claim 15, where identifying text pairs further comprises:
   comparing each signature corresponding to text in the first natural language with a plurality of adjacent signatures corresponding to text the second natural language according to a lexicographical ordering of signatures.

21. The system of claim 15, the one or more computers further operable to perform operations comprising:
   using the identified candidate text pairs to identify parallel texts.

* * * * *

UNITED STATES PATENT AND TRADEMARK OFFICE
CERTIFICATE OF CORRECTION

PATENT NO. : 8,175,864 B1
APPLICATION NO. : 12/060126
DATED : May 8, 2012
INVENTOR(S) : Moshe Dubiner It is certified that error appears in the above-identified patent and that said Letters Patent is hereby corrected as shown below:

Column 13, Line 35, Claim 1; replace:
"n grams" should be --n-grams--

Column 13, Line 44, Claim 1; replace:
"n grams" should be --n-grams--

Column 13, Line 67, Claim 3; replace:
"n grams" should be --n-grams--

Column 14, Line 2, Claim 3; replace:
"n grams" should be --n-grams--

Column 14, Line 4, Claim 3; replace:
"n grams" should be --n-grams--

Column 14, Line 16, Claim 4; replace:
"n grams" should be --n-grams--

Column 14, Line 38, Claim 6; insert:
after "text", insert --in--

Column 14, Lines 49-50, Claim 8; replace:
"n grams" should be --n-grams--

Column 14, Line 57, Claim 8; replace:
"n grams" should be --n-grams--

Column 15, Line 15, Claim 10; replace:
"n grams" should be --n-grams--

Signed and Sealed this
Eighteenth Day of September, 2012

David J. Kappos
*Director of the United States Patent and Trademark Office*

CERTIFICATE OF CORRECTION (continued)
U.S. Pat. No. 8,175,864 B1

Column 15, Line 16, Claim 10; replace:
"n grams" should be --n-grams--

Column 15, Line 18, Claim 10; replace:
"n grams" should be --n-grams--

Column 15, Line 29, Claim 11; replace:
"n grams" should be --n-grams--

Column 15, Line 49, Claim 13; insert:
after "text", insert --in--

Column 15, Line 61, Claim 15; replace:
"n grams" should be --n-grams--

Column 16, Line 3, Claim 15; replace:
"n grams" should be --n-grams--

Column 16, Line 26, Claim 17; replace:
"n grams" should be --n-grams--

Column 16, Line 27, Claim 17; replace:
"n grams" should be --n-grams--

Column 16, Line 29, Claim 17; replace:
"n grams" should be --n-grams--

Column 16, Line 40, Claim 18; replace:
"n grams" should be --n-grams--

Column 16, Line 60, Claim 20; insert:
after "text", insert --in--